Patented Nov. 6, 1951

2,574,451

UNITED STATES PATENT OFFICE 2,574,451

CATALYTIC DESULFURIZATION OF PETROLEUM HYDROCARBONS

Frederick William Bertram Porter and Roy Purdy Northcott, Sunbury-on-Thames, England, assignors to Anglo-Iranian Oil Company Limited, London, England, a British joint-stock corporation No Drawing. Application April 27, 1950, Serial No. 158,598. In Great Britain May 9, 1949

3 Claims. (Cl. 196—28)

The invention relates to the catalytic desulphurisation of petroleum hydrocarbons, and more particularly to the catalytic desulphurisation of tractor vapourising oil or power kerosine.

In the specifications of the co-pending applications Nos. 35,976, 46,502, 68,416, 100,538, and 94,262, there are described processes for the catalytic desulphurisation of petroleum fractions ranging from light distillates, such as light naphtha, to heavy distillates, such as wax distillates, in which the feedstock is passed to a catalytic desulphurisation zone where it is treated in the presence of a sulphur-resistant hydrogenation catalyst, as specified, under conditions of temperature and pressure such that sufficient hydrogen is produced by dehydrogenation of naphthene hydrocarbons contained in the feedstock to effect the conversion of sulphur compounds contained in the feedstock into hydrogen sulphide and to provide a hydrogen-rich gaseous fraction which is recycled to the catalytic desulphurisation zone in order to maintain the necessary partial pressure of hydrogen therein. It will be appreciated that such processes are carried out without the necessity of using extraneous hydrogen and it is convenient to designate such processes as "autofining" processes, to distinguish them from similar catalytic deulphurisation processes carried out with the aid of extraneous hydrogen, the latter processes being commonly called "hydrofining" processes.

Tractor vapourising oil or power kerosine as used in tractor engines must have a sufficiently high octane number to avoid reducing the compression ratio to a point at which efficiency is seriously impaired. Straight-run kerosine has too low an octane number for use as a tractor vapourising oil or power kerosine and is therefore blended with selected fractions of high octane number, such for example, as aromatic extracts or heavy spirits from thermal or catalytic cracking processes. As these blending components have a relatively high boiling range, they usually have a high sulphur content, and heavy refining treatments are necessary to ensure that the sulphur content of the finished blend is within specification. The refining treatments are usually carried out on the individual components of the blend and in the specification of the co-pending application No. 142,942 the autofining of aromatic extracts is described. However, it is not essential to autofine individual components before blending and it may be more desirable or convenient to refine the finished blend.

According to the invention, the desulphurisation of a blended fuel suitable for use as a tractor vapourising oil or power kerosine, is effected by passing the fuel in admixture with hydrogen over a catalyst which combines activity for dehydrogenation of naphthene molecules to aromatics with activity for the conversion of organically combined sulphur to hydrogen sulphide, and which is not poisoned as a catalyst by the presence of sulphur compounds, at a temperature and at a pressure to effect the conversion of a considerable proportion of the sulphur contained in the fuel into hydrogen sulphide, and to produce a hydrogen-rich gas mixture which is separated from the treated fuel and recycled to the reaction zone at a rate sufficient to maintain the necessary partial pressure of hydrogen therein.

It is believed that the reaction proceeds by dehydrogenation of some of the naphthenes present in the fuel to produce hydrogen in excess of that required to convert the combined sulphur present into hydrogen sulphide, and the reaction conditions must therefore be determined having regard to any limiting conditions imposed by these two reactions. Thus, there is a lower temperaure of about 700° F., below which little dehydrogenation would occur and below which the reaction would not be self-supporting in hydrogen. This lower temperature depends to some extent on the sulphur content, and the higher the sulphur content, the higher the minimum temperature necessary to provide sufficient hydrogen. At temperatures above about 800° F., dehydrogenation and cracking occur to such an extent that the product becomes increasingly aromatic and unsaturated. Furthermore, at temperatures above 800° F. the on-stream time is reduced. The preferred temperature of operation is also to some extent dependent upon the pressure employed which is preferably between 50 and 250 lb./sq. in. As the pressure is increased, the minimum temperature at which satisfactory dehydrogenation of the naphthenes can be obtained increases, and if at a fixed temperature the pressure is sufficiently increased, the reverse reaction of hydrogenation of aromatics begins to occur. Thus, when operating at the higher pressures, it is preferable to use higher temperatures. Similarly, it is desirable to avoid the combination of high temperature and low pressure since such conditions lead to a short on-stream time for satisfactory operation. By operating under the optimum conditions, on-stream times of 300 to 400 hours before regeneration are possible.

The space velocity may be varied according to the degree of desulphurisation required and the activity of the catalyst, but space velocities above 10 v./v./hr. result in a low degree of desulphurisation.

Operating under the conditions above described the gases separated by cooling the treated fuel at reaction pressure contain 70% to 80% by volume of hydrogen and are continuously recycled to the reaction zone. It has been found that the hydrogen sulphide content of the separated gas builds up to an equilibrium concentration, after which the gases may be recycled to the reaction zone without further increase in the content of hydrogen sulphide which is thereafter dissolved in the product until such time as it is depressurised. If desired, however, the hydrogen sulphide may be removed from the gas by any of the usual methods and the hydrogen sulphide-free gas recycled to the reaction zone. The gas may be submitted to treatment in known manner for increasing the relative proportion of hydrogen therein, as by passage through an oil tower. It is not necessary to supply extraneous hydrogen to the reaction zone when starting the process as the gases separated from the treated fraction may be allowed to build up to form the recycle gas.

Among the catalysts that may be used are metal sulphides and oxides, especially those of the 6th group either alone (for example chromium oxide and tungsten sulphide) or in admixture with other sulphides or oxides (for example, pellets consisting of two parts tungsten sulphide and one part nickel sulphide) or in combination with other oxides or sulphides (for example, cobalt molybdate or thiomolybdate) or mixed with, or deposited on, a porous support such as natural or processed bauxite, activated alumina and kieselguhr. Natural and processed bauxite may themselves be used as catalysts. The preferred catalyst consists of cobalt molybdate supported on alumina.

An effective pelleted catalyst was prepared by mixing powdered cobalt oxide, molybdic oxide and alumina, and pelleting with 1% graphite into $\frac{3}{16}$" pellets which were then treated for two hours at 550° C. The catalyst may also be prepared by extrusion.

An effective cobalt molybdate type catalyst was prepared by the impregnation of roasted Indian bauxite with cobalt molybdate solution, so that the molybdenum content of the material stable at 1000° F. was 3.6% by weight, while the cobalt content of the material stable at 1000° F. was 1.0% weight.

The autofining process may be operated by setting the pressure in the autofining zone at a predetermined level and thereafter withdrawing from the system gas in excess of that required to maintain the predetermined pressure. In this case, there is a continuous make of hydrogen indicating that the hydrogen produced in the dehydrogenation reaction is not being fully utilised in the desulphurisation reaction. An improved method of operation was therefore developed in which the hydrogen-containing gaseous fraction is recycled to the reaction zone and the pressure therein allowed to rise to an equilibrium pressure at which the hydrogen evolved equals the hydrogen consumed. This method of operation results in a greater degree of desulphurisation and increased on-stream hours for a product of given sulphur content.

The preferred catalyst for use in the autofining process is of the so-called cobalt molybdate type which consists of the oxides of cobalt and molybdenum deposited on or incorporated with a support, preferably alumina. It has been found that there is a period at the commencement of each run during which the gas make is negligible or non-existent and the desulphurisation is not at its maximum. This low dehydrogenating activity of the catalyst is more noticeable at low feedstock velocities and with the heavier feedstocks. It was discovered that the inactivity of the catalyst during the early hours on-stream could be largely overcome by subjecting the cobalt molybdate catalyst to the action of hydrogen sulphide or hydrogen sulphide-containing gases prior to its use in the autofining process.

The invention will now be described with reference to the following examples:

EXAMPLE 1

A fuel was blended from the following components:

41% vol. Iranian kerosine, $SO_2$ extract, 140–285° C. ASTM (S=1.0% wt.)

33% vol. Iranian kerosine, 180–270° C. ASTM (S=0.33% wt.)

26% vol. Iranian naphtha, 160–210° C. ASTM (S=0.14% wt.)

The fuel was vaporised and was passed at a space velocity of 5.0 v./v./hr. to an autofining zone maintained at a temperature of 780° F. and at a pressure of 100 pounds per square inch gauge and was contacted in the zone with a catalyst consisting of cobalt molybdate supported on alumina. The process was continued for upwards of 200 hours during which time the gas make varied from 7–30 s. c. f./b., and the gas was recycled to the autofining zone at a rate of 2000 s. c. f./b.

The inspection data on the unrefined blend and on the topped and rerun bulked product are set out in the following table, No. 1, the last column of which gives a standard specification for tractor vapourising oils:

TABLE 1

| Inspection Data | Feedstock | Topped and Rerun Bulked Product | Standard specification for Tractor Vapourising Oil |
|---|---|---|---|
| Yield, Per Cent Vol. | 100 | 92 | |
| Per cent volume to 160° C. | | | 5% min. |
| Per cent volume to 185° C. | 30 | 34 | Less than 50%. |
| Per cent volume to 200° C. | 55 | 60 | 50% min. |
| Per cent volume to 240° C. | 90 | 94.5 | Less than 95% |
| F. B. P. | 265 | 249 | 275° C. max. |
| Colour, Saybolt | −8 | +21 | 14 min. |
| Odour | U. M. | M | M. |
| Flash point, ° F. | | 130 | 90 min. |
| Sulphur, wt. per cent | 0.544 | 0.05 | 0.35 max. |
| Octane No. M. M. | 52 | 54 | 50 min. |
| Copper Strip Corrosion (ASTM D. 130-30). | | Pass | Must Pass. |
| Gum (Preformed) | | 6 | 20 max. |
| Gum (Potential) | | 20 | 30 max. |

EXAMPLE 2

A fuel was blended from the following components:

25% vol. catalytically cracked cut, 170–280° C. ASTM (S=4.5% wt.)

42% vol. Iranian kerosine, 180–270° C. ASTM (S=0.33% wt.)

33% vol. Iranian naphtha, 160–210° C. ASTM (S=0.14% wt.)

The fuel was vapourised and was passed at a space velocity of 0.5 v./v./hr. to an autofining zone maintained at a temperature of 800° F. and at a pressure of 100 pounds per square inch gauge, and was contacted in the zone with a catalyst consisting of cobalt molybdate supported on alumina. The process was continued for upwards of 100 hours during which time the average gas make was 45 s. c. f./b., and the gas was recycled to the reaction zone at a rate of 4000 s. c. f./b.

The inspection data on the feedstock and on the topped and rerun bulked product are set out in the following table, No. 2, the last column of which gives a standard specification for tractor vapourising oil:

TABLE 2

| Inspection Data | Feed-stock | Bulked Product, Topped and Rerun | Standard specification for Tractor Vapourising Oils |
|---|---|---|---|
| Yield, per cent vol | 100 | 92.5 | |
| Per cent vol. to 160° C | | 1 | 5% min. |
| Per cent vol. to 185° C | 10 | 20 | Less than 50%. |
| Per cent vol. to 200° C | 30 | 42 | 50% min. |
| Per cent vol. to 240° C | 75 | 85 | Less than 95%. |
| F. B. P., ° C | 270 | 260.5 | 275 max. |
| Colour, Saybolt | <−16 | +14 | 14 min. |
| Odour | U. M. | M | M. |
| Flash Point, ° F | | 108 | 90 min. |
| Sulphur, per cent wt | 1.43 | 0.05 | 0.35 max. |
| Octane No. (M. M.) | 47 | 56 | 50 min. |
| Copper Strip Corrosion | | Pass | Must Pass. |
| Gum (Preformed) | | 10 | 20 max. |
| Gum (Potential) | | 18 | 30 max. |

It will be seen that in addition to reducing the sulphur content of the blend to considerably below specification, the autofining process also produces an increase in octane number, particularly in the case of the blend containing a catalytically cracked fraction of high sulphur content. Such a fraction is difficult to refine by ordinary refining methods.

A simple distillation may be necessary to bring the boiling range and flash point of the product within specification, but such rerunning may be avoided by the use of a "knock-out" drum on the exit line from the reactor.

EXAMPLE 3

A mixture of 45% by volume of $SO_2$ kerosine extract of Iranian origin having a sulphur content of 0.9% wt. and 55% by volume of kerosine of Iranian origin boiling between 160° C. and 260° C., the mixture having a total sulphur content of 0.55% wt., was passed at a temperature of 780° F. and a pressure of 100 lb./sq. in. over a catalyst consisting of cobalt molybdate supported on alumina. The space velocity was maintained at 5.0 v./v./hr. and the process was continued satisfactorily for a period of 200 hours during which time there was an average gas make of 20 cu. ft./bbl. This gas contained 85% by volume of hydrogen and was recycled to the reaction zone at the rate of 2000 cu. ft./bbl.

The product represented 99% weight on feed and the inspection data of the feedstock and product are set out in the following table, No. 3.

TABLE 3

| Inspection Data | Feed-stock | Product |
|---|---|---|
| S. G. @ 60° F | 0.829 | 0.825 |
| Vol. to 160° C | Nil | 2% |
| Vol. to 260° C. per cent | 100 | 100 |
| Colour, Saybolt | −8 | +12 |
| Sulphur, per cent wt | 0.55 | 0.045 |
| Sulphur Removal, per cent | | 92 |
| Octane No., M. M | 52.0 | 54.0 |

It was only necessary to give the product a light soda wash: It will be seen that a product having a sulphur content of 0.45% weight was obtained from a feedstock having a sulphur content of 0.55% weight, representing a sulphur removal of 92% by weight. The product showed a gain of two octane numbers and was satisfactory for use as a tractor vapourising oil without further treatment.

EXAMPLE 4

Feedstock components

45% vol. Iranian/Iraqui kerosine $SO_2$ extract, 163 to 293° C. ASTM

35% vol. Iranian/Iraqi kerosine, 162 to 301° C. ASTM

20% vol. Iranian/Iraqi naphtha, 143 to 184° C. ASTM

Autofining conditions

Catalyst, cobalt molybdate on alumina
Temperature, 780° F.
Pressure, 100 p. s. i. ga.
Space velocity, 3.0 v./v./hr.
Recycle rate, 2000 c. f./b.
Duration of run, 422 hours
Average gas make, 2.5 c. f./b.

| Inspection Data | Feed-stock | Bulked Product |
|---|---|---|
| S. G., 60° F./60° F | 0.824 | 0.821 |
| I. B. P., ° C | 151 | 149 |
| 10% vol. @ ° C | 164.5 | 164 |
| 50% vol. @ ° C | 185 | 186 |
| 90% vol. @ ° C | 243 | 243.5 |
| F. B. P., ° C | 292 | 283.5 |
| Colour, Saybolt | −6 | −9 |
| Sulphur, per cent wt | 0.577 | 0.126 |
| Sulphur Removal, per cent | | 78 |
| Octane No. (M. M.) | 48.1 | 51.2 |

We claim:

1. A process for the hydrocatalytic desulphurization of a sulphur-and-naphthene-containing blended fuel suitable for use as a tractor vaporizing oil or power kerosene, said fuel consisting of a mixture of catalytically cracked naphtha, kerosene and straight run naphtha, which process is self-supporting with respect to the hydrogen needed and is productive of a desulphurized blended fuel having, except for lowered sulphur content, properties and boiling range substantially the same as the feedstock, comprising the steps of: passing the blended fuel to be desulphurized to a reaction zone and contacting the fuel therein with a dehydrogenation-hydrogenation catalyst and with hydrogen derived solely from the fuel, said catalyst being resistant to sulphur poisoning and combining activity for the dehydrogenation of naphthenes in said fuel to aromatics with activity for the hydrogenation of organically combined sulphur in said fuel to hydrogen sulphide; maintaining a selected temperature in said zone between about 700° F. to about 800° F. at which hydrogen is continuously produced from said fuel; maintaining a selected pressure in said zone between about 50 to about 250 lbs./sq. in. gauge, said selected temperature and pressure being correlated to provide, from the dehydrogenation of naphthenes contained in said fuels, a net production of hydrogen at least sufficient to convert organically combined sulphur in said fuel into hydrogen sulphide and to maintain said selected pressure; separating hydrogen sulphide and a hydrogen-rich gas mixture from the desulphurized fuel; recycling said hydrogen-rich gas mixture to the reaction zone to constitute the whole of the hydrogen supplied to said zone, the hydrogen recycle rate being sufficient to maintain the necessary partial pressure of hydrogen in said zone; and, recovering the desired desulphurized blended fuel from the residue of said separating operation.

2. A process according to claim 1 wherein said blended fuel is passed to said reaction zone at a space velocity between about 0.5 and about 5.0 v./v./hr., wherein the selected temperature is approximately 780° F., wherein the selected pressure is approximately 100 lbs./sq. in. gauge, and wherein said hydrogen-rich gas mixture is recycled to the reaction zone at a rate between about 2000 and 4000 cu. ft./bbl. of feedstock.

3. A process according to claim 1 wherein the catalyst consists of the combined oxides of cobalt and molybdenum supported on alumina.

FREDERICK WILLIAM BERTRAM PORTER.
ROY PURDY NORTHCOTT.

REFERENCES CITED

The following references are of record in the file of this patent:

UNITED STATES PATENTS

| Number | Name | Date |
|---|---|---|
| 2,253,308 | Rosen | Aug. 19, 1941 |
| 2,352,059 | Woog | June 20, 1944 |
| 2,393,288 | Byrns | Jan. 22, 1946 |
| 2,417,308 | Lee | Mar. 11, 1947 |
| 2,440,236 | Stirton | Apr. 27, 1948 |
| 2,441,297 | Stirton | May 11, 1948 |
| 2,461,069 | Marisic et al. | Feb. 8, 1949 |
| 2,498,559 | Layng et al. | Feb. 21, 1950 |